(12) United States Patent
Letellier

(10) Patent No.: US 6,384,936 B1
(45) Date of Patent: May 7, 2002

(54) PRINTER EFFORT REDUCTION THROUGH CACHING AND REDUCTION

(75) Inventor: Nolan W. Letellier, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/179,705

(22) Filed: Oct. 26, 1998

(51) Int. Cl.⁷ ................................................ G06F 15/00
(52) U.S. Cl. ........................................ 358/1.9; 358/450
(58) Field of Search ........................ 358/1.9, 450, 448, 358/1.8

(56) References Cited

U.S. PATENT DOCUMENTS

| | | | | |
|---|---|---|---|---|
| 5,020,005 A | * | 5/1991 | Fujii | 364/519 |
| 5,450,099 A | * | 9/1995 | Stephenson | 347/200 |
| 5,682,504 A | * | 10/1997 | Kimura | 395/104 |
| 5,872,897 A | * | 2/1999 | Jones | 395/109 |
| 6,005,987 A | * | 12/1999 | Nakamura et al. | 382/294 |
| 6,069,709 A | * | 5/2000 | Harrington | 358/1.8 |

* cited by examiner

Primary Examiner—Jerome Grant, II

(57) ABSTRACT

A system and method simplify shapes for printing. A first shape is received by an output device such as a printer. The first shape is stored in a temporary storage cache. A second shape is received by the output device. The first shape is compared to the second shape. The first and second shapes are divided into overlapping and non-overlapping portions. The non-overlapping portions of the first shape are re-cached. The non-overlapping portions of the second shape are buffered until they are processed. The overlapping portions of the first and second shapes are simplified.

20 Claims, 3 Drawing Sheets

PRINTER EFFORT REDUCTION THROUGH CACHING AND REDUCTION

FIELD OF THE INVENTION

This invention relates in general to color printer technology and, more particularly, to a system and method for simplifying overlapping shapes for printing.

BACKGROUND OF THE INVENTION

Many computer applications perform a gradient fill of an area by using rectangles of varying colors. Some of these applications create the gradient fill for a shape as a series of three layers. This approach is a simple method for allowing the applications to use a single algorithm for all shapes of gradient.

FIGS. 1–3 illustrate the typical three-layer approach for a gradient fill. A first layer 2 is a general-purpose gradient drawn with an exclusive OR (XOR) raster operation (ROP). First layer 2 is shown with hatch lines to indicate a color. The color of first layer 2 is the desired color of the gradient.

A second layer 4 is drawn in black with a source (SRC) ROP and acts to mask the desired final shape of the gradient. A third layer 6 is another general-purpose gradient drawn with an XOR ROP. Third layer 6 is the same shape, color, and size as first layer 2. FIG. 3 shows the result of the three layers. The remaining portion of third layer 6 is also shown with hatch lines to indicate a color.

Every shape to be drawn is composed of pixels. Each pixel drawn with an XOR ROP will cancel out any other pixel drawn with an XOR ROP that it overlaps which is the same color. Each pixel drawn with an SRC ROP will simply overwrite any pixel that it overlaps.

In areas where there is no mask 4 drawn, the two layers of general-purpose gradient 2, 6 cancel each other out, leaving no marks to be printed on a page. In areas where the mask 4 is drawn, the first XOR layer 2 is overwritten with black. The result is that the second XOR layer 6 is written on the page.

One drawback to this approach is that a printer is required to process each of the three layers before printing, even though some of the layers have no impact on the printed page. For a 600 dot per inch (dpi) image at 24 bits-per-pixel on an 8½ by 11 inch page with ¼ inch margins, each layer includes about 30 million pixels. Together the three layers include about 90 million pixels.

SUMMARY OF THE INVENTION

According to principles of the present invention, a system and method simplify shapes for printing. A first shape is received by a printer driver. The first shape is stored in a temporary storage cache. A second shape is received by the printer driver. The first shape is compared to the second shape. The first and second shapes are divided into overlapping and non-overlapping portions. The non-overlapping portions of the first shape are re-cached. The non-overlapping portions of the second shape are buffered until they are processed. The overlapping portions of the first and second shapes are simplified.

According to further principles of the present invention, the overlapping portions of the first and second shapes are simplified by evaluating the raster operation (ROP) for each shape and retaining the resulting overlapping portions of each shape.

Other objects, advantages, and capabilities of the present invention will become more apparent as the description proceeds.

DETAILED DESCRIPTION OF THE INVENTION

Figure 1:
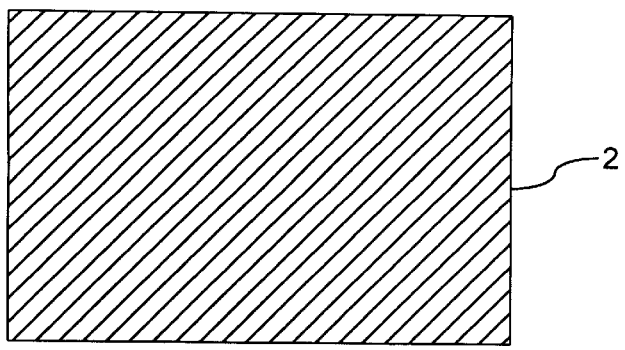
FIG. 1 is a first layer of the prior art three-layer method of creating a shape.
Figure 2:
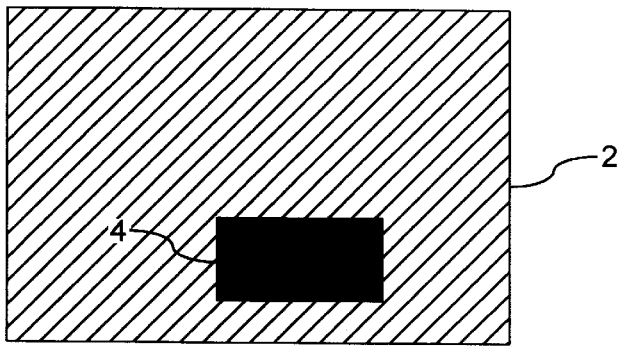
FIG. 2 is a second layer superimposed on top of the first layer of FIG. 1.
Figure 3:
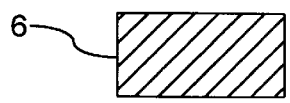
FIG. 3 is a diagram showing the result of a third layer superimposed on top of the first layer of FIG. 1 and the second layer of FIG. 2.
Figure 5:
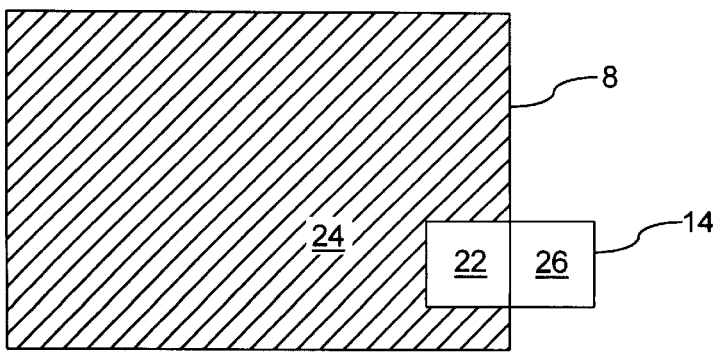
FIG. 5 is a diagram for illustrating the steps of the method of the present invention.
Figure 4:
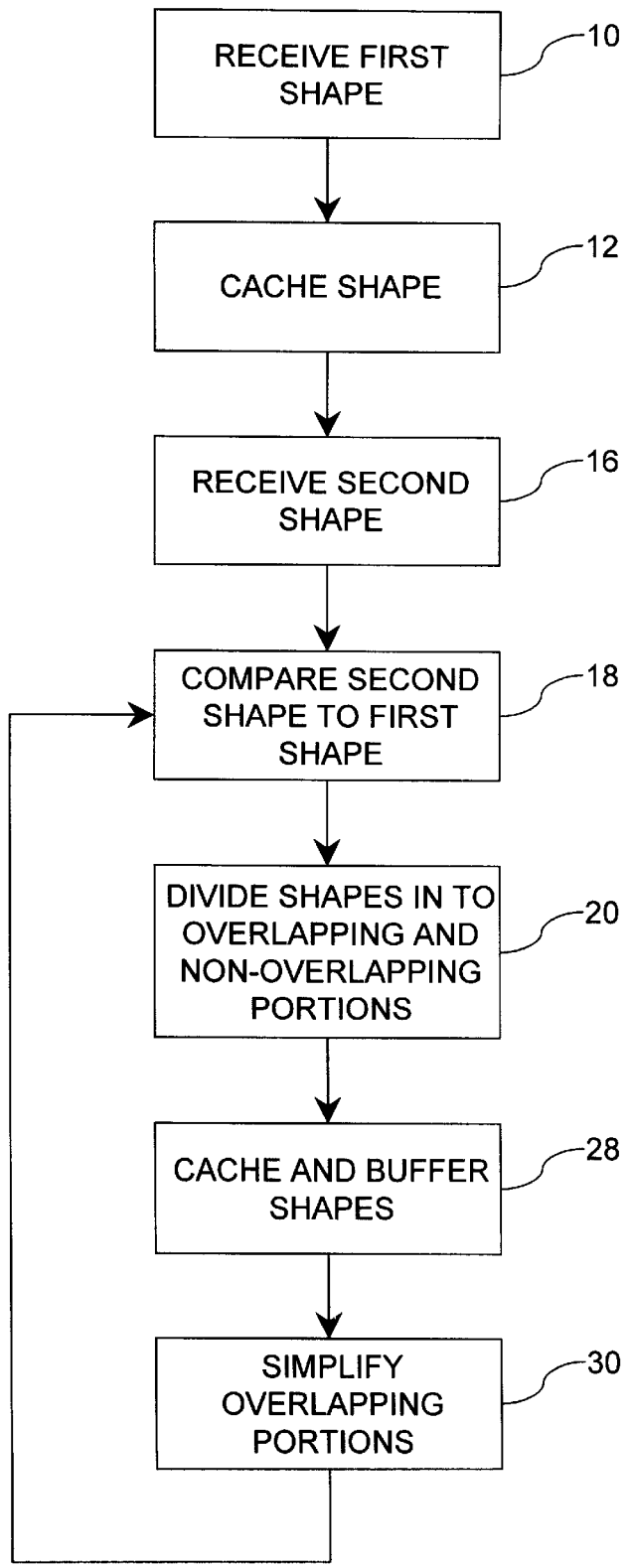
FIG. 4 is a flow chart illustrating the method of the present invention.

FIG. 4 is a flow chart showing one embodiment of the present invention method for simplifying shapes for printing. Reference is also made to FIG. 5 to illustrate the method of the present invention. The method of the present invention may be implemented within a printer or by a printer driver on a computer before sending the shapes to a printer.

A first shape 8 is received 10 by a printer driver. First shape 8 is stored 12 in a temporary storage cache. A second shape 14 is received 16 by the printer driver. In one embodiment, if a received shape 8 or 14 is not a simple rectangle, the cache is flushed causing all the stored shapes and the current shape to be sent to a printer for printing. A simple rectangle is a borderless rectangle drawn in a single solid color.

Second shape 14 is compared 18 to all shapes stored in cache memory. For the purpose of clarity, the remaining steps will be described as if first shape 8 were the only shape stored in cache memory. First 8 and second 14 shapes are divided 20 into overlapping 22 and non-overlapping 24, 26 portions. Non-overlapping portions 24 of first shape 8 are re-cached 28. Non-overlapping portions 26 of second shape 14 are buffered 28 until they are processed. Overlapping portions 22 of first 8 and second 14 shapes are simplified 30 and cached. Steps 18 through 30 are then repeated for each remaining buffered non-overlapping portion 26 of second shape 14. Steps 16 through 30 are then repeated for all remaining shapes to be simplified.

Figure 6:
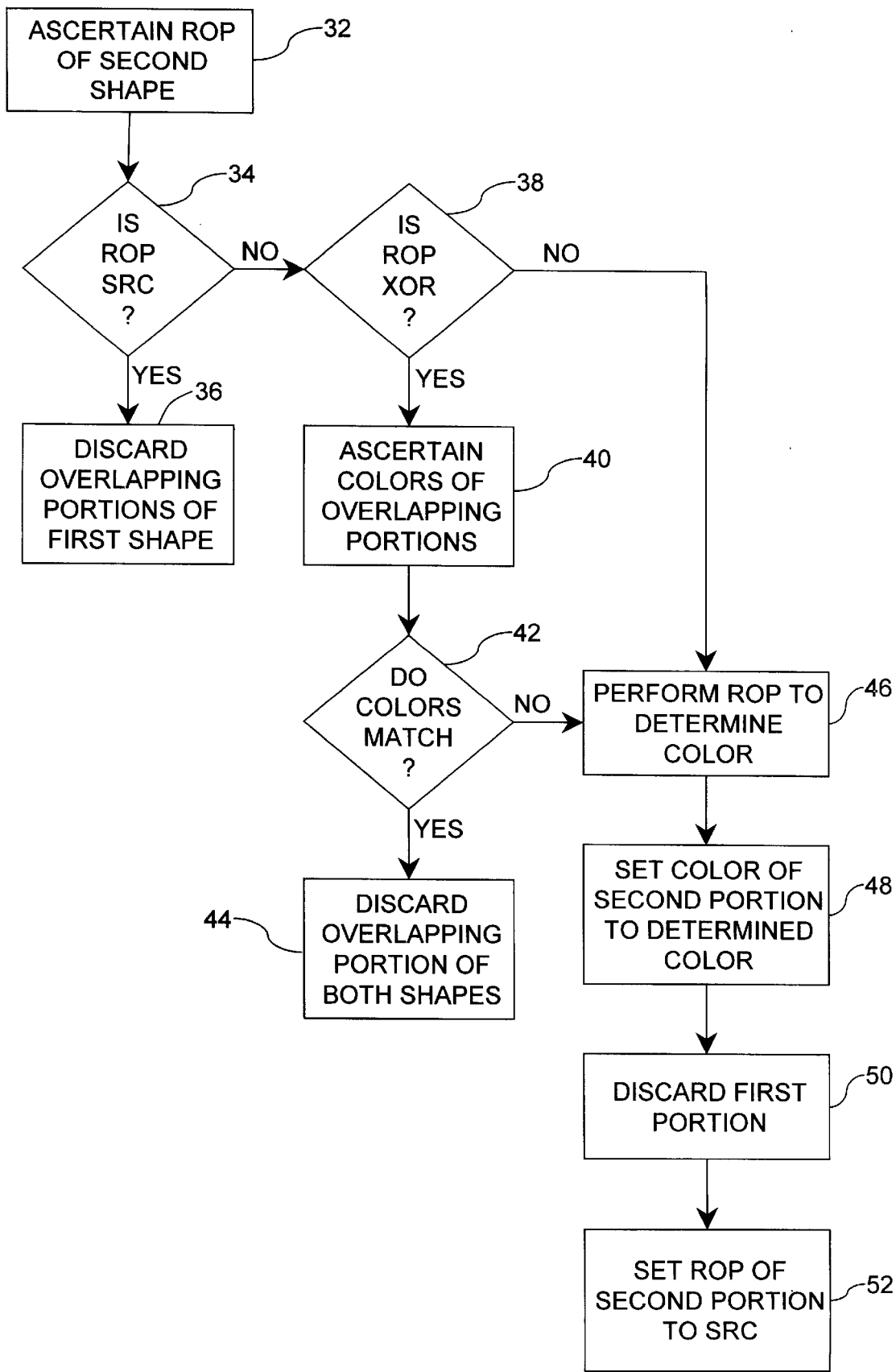
FIG. 6 is a flow chart illustrating the simplification step of the present invention.

One embodiment for simplification 30 of each overlapping portion 22 is shown by the flow chart of FIG. 6. First the raster operation (ROP) of overlapping portion 22 of second shape 14 is ascertained 32. A determination 34 is made whether the ROP of overlapping portion 22 of second shape 14 is a source (SRC). If the ROP is an SRC, overlapping portion 22 of first shape 8 is discarded 36.

If the ROP of overlapping portion 22 of second shape 14 is not an SRC, a determination 38 is made whether the ROP is an exclusive or (XOR). In one embodiment, if the ROP is not an XOR, the ROP is performed (46) to determine a resulting color. In another embodiment, if the ROP is not an XOR, the cache is flushed 56 causing all the stored shapes and the current shape to be sent to a printer for printing.

If the ROP is an XOR, the color of overlapping portions 22 of first 8 and second 14 shapes are ascertained 40. A determination 42 is then made whether the color of overlapping portion 22 of first shape 8 matches the color of overlapping portion 22 of second shape. If the colors match, overlapping portions 22 are both discarded.

If the colors do not match, the ROP is performed 46 to determine a resulting color. The resulting (or determined) color is determined by combining the color of overlapping portion 22 of first shape 8 with the color of overlapping portion 22 of second shape 14 according to the logic specified by the ROP. For example, if the ROP is an AND operation, each bit of the color value of the overlapping portion 22 of first shape 14 is ANDed with a corresponding bit of the color value of overlapping portion 22 of second shape 14.

Next, the color of overlapping portion 22 of second shape 14 is set 48 to the determined color. Then, overlapping portion 22 of first shape 8 is discarded 50 and the ROP of overlapping portion 22 of second shape 14 is changed 52 to SRC. However, if the color of overlapping portion 22 of first shape 8 is black and the ROP of overlapping portion 22 of second shape 14 is an XOR, the determined color will result in the same color as the color of overlapping portion 22 of second shape 14. In this instance, the color of overlapping portion 22 of second shape 14 is not changed in step 48.

It should be understood that the foregoing description is only illustrative of the invention. Various alternatives and modifications can be devised by those skilled in the art without departing from the invention. In addition, while the invention has been described with respect to a printer, it is equally applicable to other output apparatus. Accordingly, the present invention is intended to embrace all such alternatives, modifications and variances which fall within the scope of the appended claims.

What is claimed is:

1. A method for simplifying shapes for printing, the method comprising:
    (a) receiving a first shape;
    (b) receiving a second shape;
    (c) comparing the second shape to the first shape to identify overlapping and non-overlapping portions of the first and second shapes;
    (d) dividing the first and second shapes into overlapping portions and non-overlapping portions; and,
    (e) simplifying the overlapping portions of the first and second shapes.

2. The method of claim 1 wherein simplifying the overlapping portions includes:
    (a) ascertaining the raster operation (ROP) of the second shape; and,
    (b) discarding each overlapping portion of the first shape if the ROP of the second shape is SRC.

3. The method of claim 1 wherein simplifying the overlapping portions includes:
    (a) ascertaining the raster operation of the second shape;
    (b) ascertaining the color of the first and second shapes;
    (c) comparing the color of the first shape to the color of the second shape; and,
    (d) discarding each overlapping portion of the first and second shapes if the ROP of the second shape is XOR and the color of the first shape is the same as the color of the second shape.

4. The method of claim 1 wherein simplifying the overlapping portions includes:
    (a) ascertaining the raster operation of the second shape;
    (b) ascertaining the color of the first shape; and,
    (c) discarding each overlapping portion of the first shape and changing the ROP of each overlapping portion of the second shape to SRC if the color of the first shape is black and the raster operation of the second shape is XOR.

5. The method of claim 1 further including caching the first shape before receiving the second shape.

6. The method of claim 1 further including caching each non-overlapping portion of the first and second shapes.

7. The method of claim 1 further including sending the shapes to a printer.

8. A system for simplifying shapes for printing, the system comprising:
    (a) means for receiving a first shape;
    (b) means for receiving a second shape;
    (c) means for comparing the second shape to the first shape; to identify overlapping and non-overlapping portions of the first and second shapes
    (d) means for dividing the first and second shapes into overlapping portions and non-overlapping portions; and,
    (e) means for simplifying the overlapping portions of the first and second shapes.

9. The system of claim 8 wherein the means for simplifying the overlapping portions includes:
    (a) means for ascertaining the raster operation (ROP) of the second shape; and,
    (b) means for discarding each overlapping portion of the first shape if the ROP of the second shape is SRC.

10. The system of claim 8 wherein the means for simplifying the overlapping portions includes:
    (a) means for ascertaining the raster operation of the second shape;
    (b) means for ascertaining the color of the first and second shapes;
    (c) means for comparing the color of the first shape to the color of the second shape; and,
    (d) means for discarding each overlapping portion of the first and second shapes if the ROP of the second shape is XOR and the color of the first shape is the same as the color of the second shape.

11. The system of claim 8 wherein the means for simplifying the overlapping portions includes:
    (a) means for ascertaining the raster operation of the second shape;
    (b) means for ascertaining the color of the first shape; and,
    (c) means for discarding each overlapping portion of the first shape and changing the ROP of each overlapping portion of the second shape to SRC if the color of the first shape is black and the raster operation of the second shape is XOR.

12. The system of claim 8 further including means for caching the first shape before receiving the second shape.

13. The system of claim 8 further including means for caching each non-overlapping portion of the first and second shapes.

14. The system of claim 8 further including means for sending the shapes to a printer.

15. A program storage device readable by a computer, tangibly embodying a program or instructions executable by the computer to perform method steps for simplifying shapes for printing, the method steps comprising:
    (a) receiving a first shape;
    (b) receiving a second shape;
    (c) comparing the second shape to the first shape; to identify overlapping and non-overlapping portions of the first and second shapes
    (d) dividing the first and second shapes into overlapping portions and non-overlapping portions; and, (e) simplifying the overlapping portions of the first and second shapes.

16. The program storage device of claim 15 wherein the step of simplifying the overlapping portions includes:
   (a) ascertaining the raster operation (ROP) of the second shape; and,
   (b) discarding each overlapping portion of the first shape if the ROP of the second shape is SRC.

17. The program storage device of claim 15 wherein the step of simplifying the overlapping portions includes:
   (a) ascertaining the raster operation of the second shape;
   (b) ascertaining the color of the first and second shapes;
   (c) comparing the color of the first shape to the color of the second shape; and,
   (d) discarding each overlapping portion of the first and second shapes if the ROP of the second shape is XOR and the color of the first shape is the same as the color of the second shape.

18. The program storage device of claim 15 wherein the step of simplifying the overlapping portions includes:
   (a) ascertaining the raster operation of the second shape;
   (b) ascertaining the color of the first shape; and,
   (c) discarding each overlapping portion of the first shape and changing the ROP of each overlapping portion of the second shape to SRC if the color of the first shape is black and the raster operation of the second shape is XOR.

19. The program storage device of claim 15 wherein the method steps further include caching the first shape before receiving the second shape.

20. The program storage device of claim 15 wherein the method steps further include caching each non-overlapping portion of the first and second shapes.

* * * * *